United States Patent [19]

Casimaty et al.

[11] Patent Number: 5,655,729
[45] Date of Patent: Aug. 12, 1997

[54] ROLL UP TRAY

[75] Inventors: Gabriel Casimaty; Lee Andrew Simonis, both of Seymour, Australia

[73] Assignee: StrathAyr Pty. Limited, Seymour, Australia

[21] Appl. No.: 503,697

[22] Filed: Jul. 18, 1995

[30] Foreign Application Priority Data

Jul. 18, 1994 [AU] Australia ................... 6873/94

[51] Int. Cl.[6] .................................................. B65H 18/22
[52] U.S. Cl. ................... 242/535.1; 242/541.3; 242/918
[58] Field of Search ................... 242/541.3, 541.2, 242/535.1, 918, 919; 100/88, 40, 76, 5

[56] References Cited

U.S. PATENT DOCUMENTS

| | | | |
|---|---|---|---|
| 1,662,577 | 3/1928 | Johnson | 242/541.3 |
| 2,057,191 | 10/1936 | Huffine | 242/541.3 |
| 2,743,065 | 4/1956 | Watkins | 242/541.3 |
| 3,991,538 | 11/1976 | Finn et al. | 242/541.3 |
| 4,277,032 | 7/1981 | Alberto et al. | 242/541.3 |
| 4,583,697 | 4/1986 | Bichot et al. | 242/541.3 |
| 5,064,000 | 11/1991 | Dover et al. | 242/541.3 |
| 5,305,963 | 4/1994 | Harvey et al. | 100/76 |

*Primary Examiner*—John M. Jillions
*Attorney, Agent, or Firm*—Edwin D. Schindler

[57] ABSTRACT

A roll up tray for lengths of material and which is particularly suitable for rolling strips of washed turf including a first conveyor to which the turf is delivered and from which the turf can be delivered to a second conveyor which is located therebeneath, a third conveyor adjacent the delivery end of the second conveyor and at an angle thereto and moving in the same direction therewith so that the turf is initially lifted by the third conveyor and is then permitted to fall back thereon so that the turf is formed into a roll. The roll of turf can be delivered in either direction from the tray by moving the second conveyor about a pivot.

26 Claims, 4 Drawing Sheets

ROLL UP TRAY

This invention relates to a roll up tray and in particular to a tray whereby wide rolls of washed turf can be formed automatically after the turf, for example, leaves a washer as a strip.

The applicant is a world leader in washed turf technology and, in general terms, turf washing removes the soil from the root zone of harvested turf to leave turf which is basically without soil.

This turf is often used in positions where a sand root zone is required. When this is a requirement, if soil is left on the turf, there can be a sheer plane between the turf and the new root bed and thus the quality of the installation is lessened.

Whilst the washed turf is relatively strong, the roots of the various plants being intertwined, it nevertheless has to be handled with some care.

Initially, the turf was provided in squares, say of approximately 400 mm per side and handling these was not difficult. However, these necessitated a great deal of labour whilst being laid. Subsequently turf was provided in rolls of the same width and this was an improvement as far as laying is concerned. More recently, there has been an endeavour to provide wider rolls which may, say, be over one meter and possibly up to two meters wide, and which enable surfaces to be rapidly and effectively covered.

Of course, as the roll becomes larger, handling becomes more difficult.

Whilst in this specification we shall refer to the handling of washed turf, the invention is equally applicable for other applications where an article to be handled is a strip of material, usually material which is difficult to handle. For example, the invention would be equally applicable to strips of unwashed turf, it could, for example be used as a take up roll for a harvester or it could have many other applications, for example in handling non-woven fabrics and the like.

It is an object of the present invention to provide an apparatus for rolling up material, particularly turf provided to it in strips and which apparatus is particularly suitable for wide rolls.

The invention, in its broadest aspect includes a roll up tray having a conveyor onto which a length of material can be delivered, a further conveyor which terminates close to the end of the second conveyor and is directed at a sharp angle relative thereto, the conveyors moving in the same direction so the material delivered to the conveyor, moves to the further conveyor, initially moves upwardly thereon, and falls back onto the following material so that as subsequent material is delivered, it is formed into a roll adjacent the junction of the conveyors.

In a further aspect, the invention includes a roll up tray having a first conveyor in association with an output conveyor of a machine and to which a length of material can be delivered, a second conveyor located beneath the outlet of the first conveyor, and a third conveyor which terminates close to the second conveyor, the second and third conveyors moving in the same direction so the material delivered to the second conveyor, moves to the third conveyor, initially moves upwardly thereon, and falls back onto the following material so that as subsequent material is delivered, it is formed into a roll adjacent the junction of the second and third conveyors.

If the material is to be rolled in the opposite sense, we provide a further conveyor before the second and third conveyor as will be described later herein.

Preferably when the roll is completed, the second conveyor can move so that the roll can pass therefrom beneath the first conveyor.

It is preferred that this movement be effected between delivery of lengths of material so that the machine can operate continuously.

Also the scope of the invention we provide a method.

The invention is particularly applicable to the handling of strips of turf but, as explained hereinbefore, is not limited to this.

The invention also includes a method of rolling a length of material comprising a conveyor along which the material is carried and a further conveyor adjacent the end of the conveyor away from the point of delivery and which is at a substantial angle to and moves in the same direction as the conveyor so that the material moving from the conveyor strikes the further conveyor, is moved upwardly and falls onto following material so as to commence the formation of a roll which is enlarged by the following material.

In order that the invention may be more readily understood, we shall describe, in relation to the accompanying drawings, one particular embodiment of machines designed to handle turf made in accordance with the invention.

The roll up tray can preferably be associated with a washing machine (not illustrated), although this is not critical, but will be used for exemplification.

When describing conveyors in this specification, they can be of any required form, but are preferably wire mesh conveyors which firstly provides a surface which presents sufficient friction for the turf to be handled, which will normally be grass side downwardly thereon, for it to be retained on the conveyor, and move therewith and which, at the same time, permits the transmission of any excess water therethrough.

Also, we shall not in this specification discuss the drive of the conveyors, they may be chain driven from some other part of the machine or by a separate motor or motors. These could be electric, or hydraulic motors or an internal combustion engine.

Conveyor drive systems are well known and conventional systems could be used.

The output conveyor 11 of the washing machine 10 will, for this description, be considered to be downwardly and outwardly directed, but this is not essential.

Figure 1:
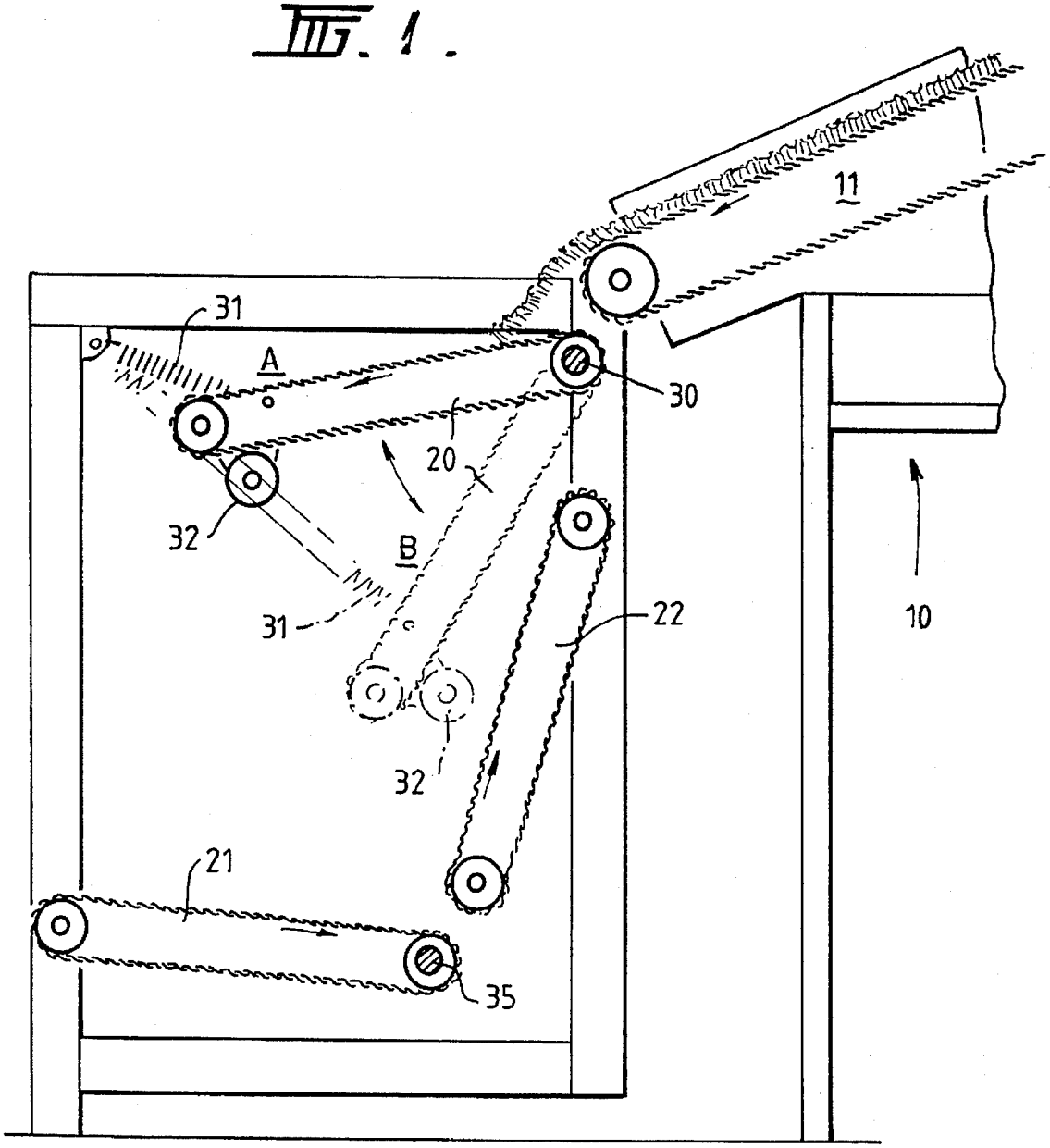
FIG. 1 shows a side elevational view of the roll up tray in a position to receive a turf strip.
Figure 2:
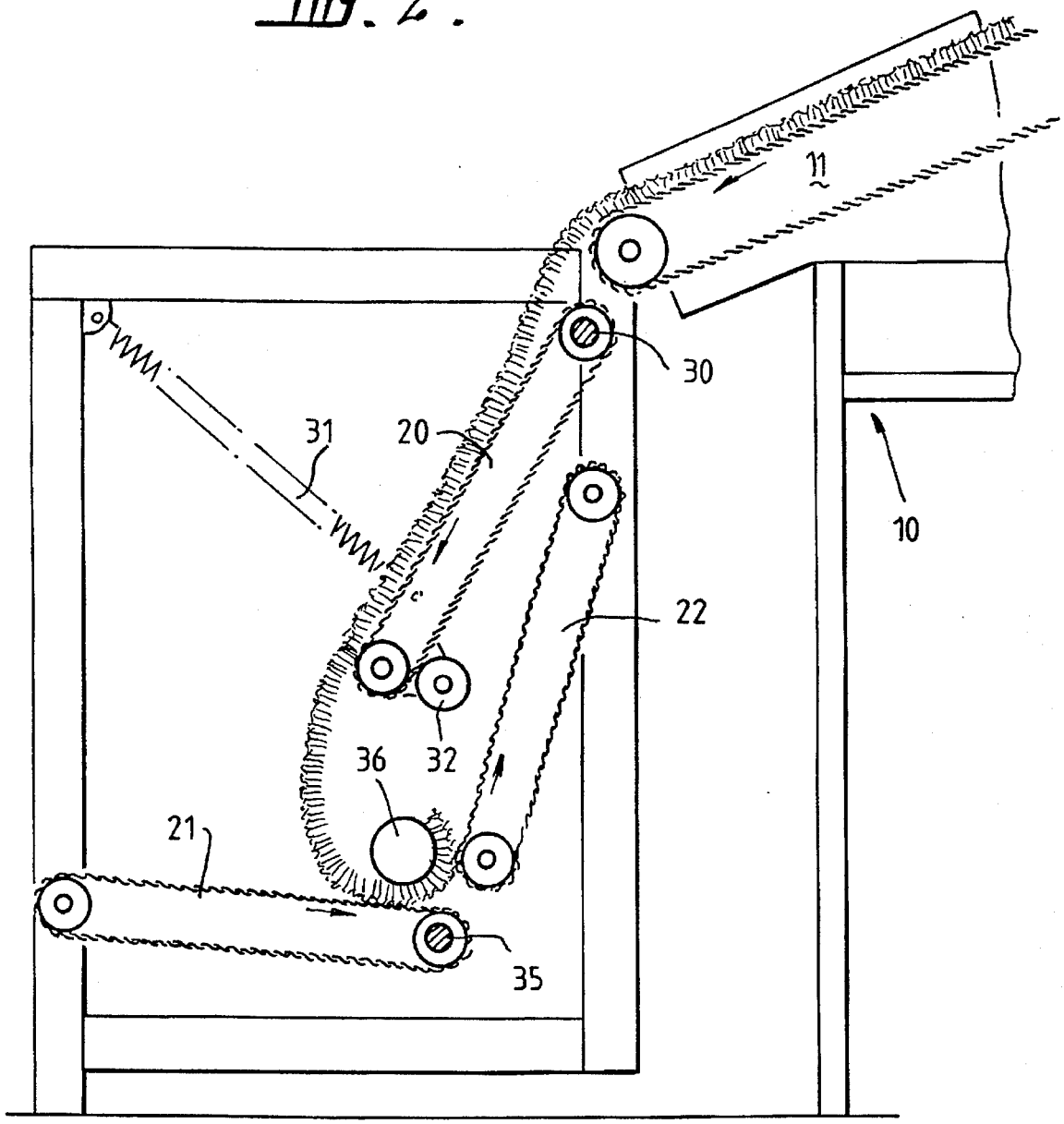
FIG. 2 is a view similar to that of FIG. 1 wherein the strip is just being delivered to the roll up tray.

The output conveyor 11 of the washing machine has, at its outer end, a conveyor 20 which is more or less a continuation thereof which conveyor is capable of moving about a pivot 30 and is loaded by a spring 31 so that when there is no load it can lie more or less horizontal, position A in FIG. 1, but when there is a turf strip thereon it will assume position B of FIG. 1. The conveyor 20 can have a roller 32 on its underside so that, as described later, when the roll of turf increases in diameter, the end of the conveyor can ride thereon and be lifted therewith.

Figure 3:
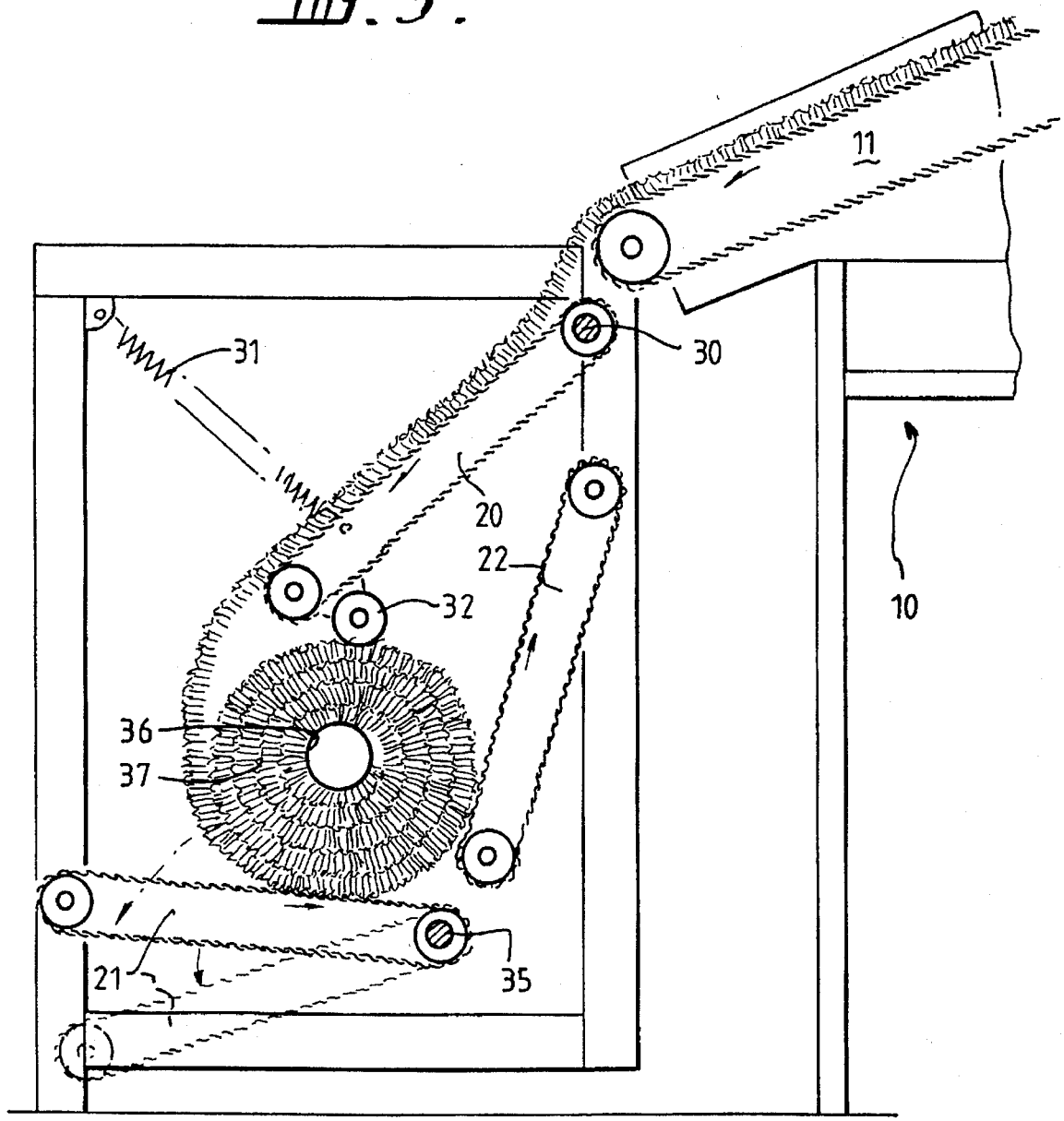
FIG. 3 is a view similar to that of the earlier figures showing a nearly completed roll and, in broken line, the position at delivery.

This first conveyor terminates above a second conveyor 21 which can be effectively horizontally located thereebeneath and the upper flight of which moves rearwardly, that is beneath the first conveyor 20. This second conveyor 21 is pivotally connected, at 35 so it can move between the position shown in FIG. 1 and that shown in broken line in FIG. 3. The purpose of this will be discussed later.

Mounted adjacent the inner end of the second conveyor 21, there is a third conveyor 22 which is directed generally upwardly but preferably slightly upwardly and outwardly relative to the second conveyor.

In its simplest form, the turf is delivered from the outlet of the washing machine to the first conveyor 20, along and over the edge of the first conveyor, until its leading edge contacts the second conveyor 21 at which it is drawn rearwardly along that conveyor. The leading edge then contacts the third conveyor 22 and tends to be lifted up by this conveyor, but, as it is unsupported, it will fall away from the conveyor to strike a following part of the turf and thus complete a basically closed cylinder. Further movement of the turf will cause a rolling action so that the turf is rolled into a cylinder with the driving force being at the points of contact of the cylinder with the second and third conveyors.

It may be preferred to place a core member 36 at the junction of the second conveyor 21 and the third conveyor 22, the core member being so located that the rearwardly moving turf passes under this and, when it falls from the third conveyor 22 will surround the core. Addition of further turf will cause it to wrap relatively closely around the This rolling action will continue for as long as turf is being supplied thus forming a roll 37 of turf.

As the roll 37 increases in size, it can contact the roller 32 on the underside of the first conveyor and cause this conveyor to move against the weight of the strip. At this time, it will be appreciated that the strip is fed directly onto the outer surface of the roll 37.

If, as is usual using our washing process, the turf is delivered root side up, the roll will normally be root side out.

When rolling is completed, the roll can be delivered from the second conveyor preferably by causing the second conveyor 21 to rotate about its pivot 35 to provide a ramp down which the roll can pass. This movement can be effected by a foot operated lever or in any other required way. The roll would then tend to roll forwardly under gravity and under momentum to be delivered from the conveyor. This may be done with the conveyors still operating or with the conveyor stopped. If there is any difficulty in effecting the removal, the conveyor could even be reversed to carry the roll thereof.

It is preferred that the delivery can be done between strips of material being fed from the outlet conveyor of the washing machine and the first conveyor 20. In this way the washing process does not have to be broken.

Also, there may be applications where it is preferred that the delivery be in the opposite sense and, in order to effect this, the second conveyor can be pivoted about its other end so that delivery is made between the second and third conveyors.

It will be appreciated that it is preferred that the inlet conveyor terminate close to the normal position of the second conveyor as it is desirable to have the distance through which the turf travels unsupported over as short a distance as possible. This is achieved by having the first conveyor spring loaded so that during the early part of formation of the roll, the conveyor is substantially downwardly directed but as the roll diameter increases, the conveyor "follows" the roll.

If it is required to roll turf grass side out, then we supply an additional conveyor as an effective extension of the first conveyor. This can extend forwardly from the first conveyor and either means can be provided to act in a manner similar to the third conveyor or, alternatively, the rolling could be effected by hand. This additional conveyor can also be used if it is required to fold small (narrow) rolls, which are normally folded by hand.

Figure 4:
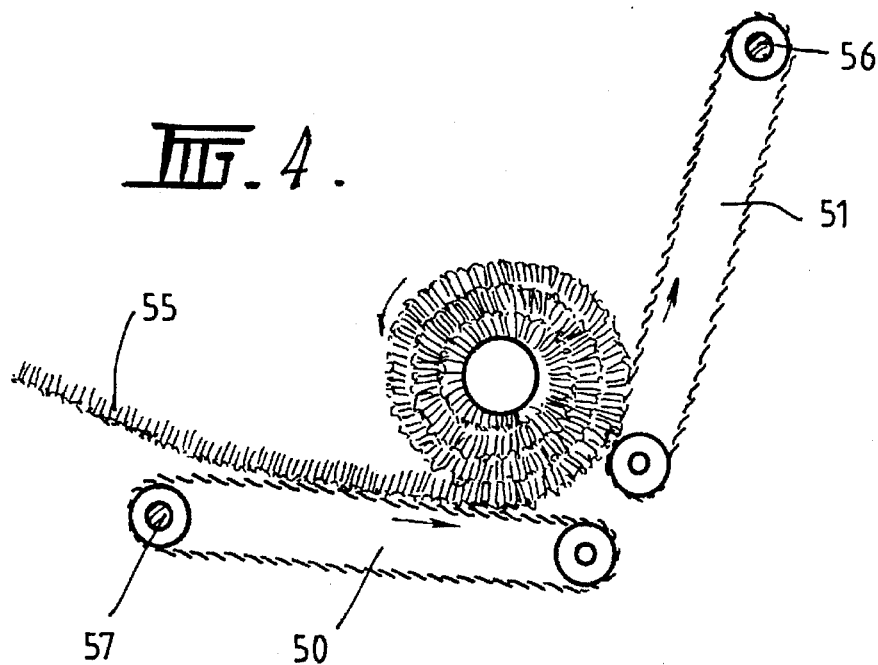
FIG. 4 is a view of an alternative form of roll-up tray which is particularly suitable for use with a harvester.
Figure 5:
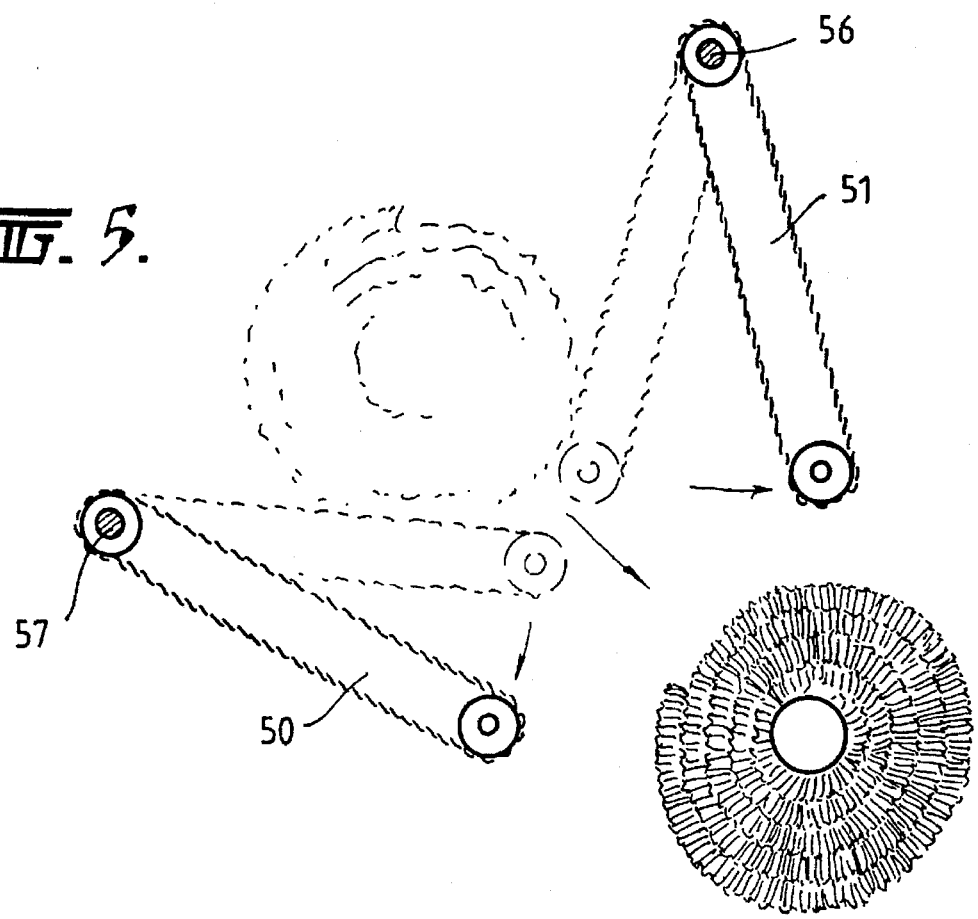
FIG. 5 is a view similar to that of FIG. 4 showing the method of delivery.

Referring to the embodiment of FIGS. 4 and 5, we show only two conveyors 50, 51 which can be considered equivalent to conveyors 21, 22 of the earlier embodiment.

In this embodiment, which is particularly useful in a harvester, the material 55 is delivered to the conveyor 50 in any required way, preferably by a further conveyor, not shown. The material moves along the conveyor 50 until it strikes conveyor 51 and, as in the previous embodiment, it moves up this conveyor and then falls back to overlay following material and the roll is formed.

When this roll is to be delivered, either the conveyor 51 is pivoted about a pivot point 56, or conveyor 50 is pivoted about a pivot point 57, or both conveyors are pivoted to permit delivery. This is the situation shown in FIG. 5.

This delivery can be effected whilst the harvester is moving forwardly and the conveyor 50 is returned to its initial position before the following material is delivered thereto.

It will be seen from this description that the invention is basically very simple, but at all times, it provides the turf to be rolled to be substantially supported and the roll itself, of course, has substantial strength and can readily be moved by rolling or the like as described, After delivery, it could be handled by a forklift or some other device which is adapted to handle rolls of the required size for later loading or storage.

We claim:

1. A roll up tray, comprising:
   a first conveyor onto which a length of material is deliverable, said first conveyor being spring-mounted;
   a second conveyor commencing close to an end of said first conveyor for receiving material from said first conveyor, said second conveyor being directed at a sharp angle relative to said first conveyor, said first conveyor and said second conveyor each being movable in the same direction so that material delivered from said first conveyor moves onto said second conveyor and initially moves upward on said second conveyor, before falling backwards onto a following portion of material so that as following portions of material are delivered to said second conveyor, a roll of material is formed adjacent the junction of said first conveyor and said second conveyor.

2. The roll up tray according to claim 1, wherein said first conveyor is spring-mounted and pivotable about a point adjacent an input end of said first conveyor so that when material is feed onto said first conveyor, an output end of said first conveyor will pivot toward said second conveyor for delivery of material thereto.

3. The roll up tray according to claim 1, wherein said first conveyor is spring mounted and pivotable at a point adjacent one end of said first conveyor so that, when rolling of material has been completed, said first conveyor would be pivotable to enable the roll of material to be delivered from said roll up tray.

4. The roll up tray according to claim 3, wherein said first conveyor is pivotable at an end which is closest said second conveyor.

5. The roll up tray according to claim 3, wherein said first conveyor is pivotable at an end which is furthest from said second conveyor.

6. The roll up tray according to claim 1, wherein said first conveyor and said second conveyor are driven independently from the delivery of material.

7. The roll up tray according to claim 1, wherein said first conveyor is driven by a drive of an output conveyor of a washing machine.

8. The roll up tray according to claim 1, wherein the length of material is a length of turf.

9. A roll up tray, comprising:

a first conveyor onto which a length of material is deliverable, said first conveyor being spring-mounted;

a second conveyor above which said first conveyor terminates, said second conveyor being able to receive a length of material from said first conveyor; and, a third conveyor commencing close to an end of said second conveyor for receiving material from said second conveyor, said third conveyor being directed at a sharp angle relative to said second conveyor, said second conveyor and said third conveyor each being movable in the same direction so that material delivered from said first conveyor to said second conveyor moves onto said third conveyor and initially moves upward on said third conveyor, before falling backwards onto a following portion of material so that as following portions of material are delivered to said third conveyor, a roll of material is formed adjacent the junction of said second conveyor and said third conveyor.

10. The roll up tray according to claim 9, wherein said first conveyor is spring-mounted and pivotable about a point adjacent an input end of said first conveyor so that when material is feed onto said first conveyor, an output end of said first conveyor will pivot toward said second conveyor for delivery of material thereto.

11. The roll up tray according to claim 9, wherein said first conveyor is spring mounted and pivotable at a point adjacent one end of said first conveyor so that, when rolling of material has been completed, said first conveyor would be pivotable to enable the roll of material to be delivered from said roll up tray.

12. The roll up tray according to claim 11, wherein said first conveyor is pivotable at an end which is closest said second conveyor.

13. The roll up tray according to claim 11, wherein said first conveyor is pivotable at an end which is furthest from said second conveyor.

14. The roll up tray according to claim 9, wherein said first conveyor is driven by a drive of an output conveyor of a washing machine.

15. The roll up tray according to claim 9, wherein the length of material is a length of turf.

16. A method for rolling a length of material, comprising the steps of:

feeding a length of material to a spring-mounted first conveyor for delivery to a second conveyor; and, receiving the length of material by said second conveyor, said second conveyor being positioned at a sharp angle relative to said first conveyor and moving in the same direction as said first conveyor, so that material received by said second conveyor from said first conveyor moves onto said second conveyor and initially moves upward on said second conveyor, before falling backwards onto a following portion of material so that as following portions of material are received by said second conveyor, a roll of material is formed adjacent the junction of said first conveyor and said second conveyor.

17. The method for rolling a length of material according to claim 16, further comprising the step of pivoting said spring-mounted first conveyor relative to said second conveyor for permitting the roll of material to be delivered therefrom.

18. The method for rolling a length of material according to claim 17, wherein in said pivoting step, said first conveyor is pivotable at an end which is closest said second conveyor.

19. The method for rolling a length of material according to claim 17, wherein in said pivoting step, said first conveyor is pivotable at an end which is furthest from said second conveyor.

20. A method for rolling a length of material, comprising the steps of:

feeding a length of material to a spring-mounted first conveyor for delivery to a second conveyor located below said spring-mounted first conveyor;

receiving the length of material by said second conveyor; and, moving the length of material from said second conveyor to a third conveyor located adjacent an output end of said second conveyor, said third conveyor being positioned at a sharp angle relative to said second conveyor and moving in the same direction as said second conveyor, so that material received by said third conveyor from said second conveyor moves onto said third conveyor and initially moves upward on said third conveyor, before falling backwards onto a following portion of material so that as following portions of material are received by said third conveyor, a roll of material is formed adjacent the junction of said second conveyor and said third conveyor.

21. The method for rolling a length of material according to claim 20, further comprising the step of pivoting said spring-mounted first conveyor relative to said second conveyor for permitting the roll of material to be delivered therefrom.

22. The method for rolling a length of material according to claim 21, wherein in said pivoting step, said first conveyor is pivotable at an end which is closest said second conveyor.

23. The method for rolling a length of material according to claim 21, wherein in said pivoting step, said first conveyor is pivotable at an end which is furthest from said second conveyor.

24. The method for rolling a length of material according to claim 20, further comprising the step of pivoting said second conveyor relative to said third conveyor for permitting the roll of material to be delivered therefrom.

25. The method for rolling a length of material according to claim 24, wherein in said pivoting step, said second conveyor is pivotable at an end which is closest said third conveyor.

26. The method for rolling a length of material according to claim 24, wherein in said pivoting step, said first conveyor is pivotable at an end which is furthest from said second conveyor.

* * * * *